United States Patent

[11] 3,634,794

| [72] | Inventor | Pol R. Verbeke<br>Redondo Beach, Calif. |
|------|----------|------------------------------------------|
| [21] | Appl. No. | 11,810 |
| [22] | Filed | Feb. 16, 1970 |
| [45] | Patented | Jan. 11, 1972 |
| [73] | Assignee | Hughes Tool Co., Aircraft Division<br>Culver City, Calif. |

[54] CURRENT LEVEL SENSOR
15 Claims, 10 Drawing Figs.

[52] U.S. Cl. .................................................. 335/153
[51] Int. Cl. .......................................... H01h 51/28, H01h 51/22
[50] Field of Search .......................................... 335/153, 154, 205, 206, 207

[56] References Cited
UNITED STATES PATENTS
3,196,232 7/1965 Lisuzzo et al. .................. 335/154
3,319,128 5/1967 Nilssen ........................ 335/153 X
3,522,563 8/1970 Frydman ....................... 335/153

*Primary Examiner*—Bernard A. Gilheany
*Assistant Examiner*—R. N. Envall, Jr.
*Attorney*—Smyth, Roston & Pavitt

ABSTRACT: A current level sensor system uses a magnetic switch such as a reed switch, and the system also includes a current-carrying coil which carries the current which has its level monitored. The current-carrying coil produces a first magnetic field having a magnitude in accordance with the level of the current and the first magnetic field interacts with the magnetic switch. A magnetic means is used which produces a second magnetic field which also interacts with the magnetic switch and the magnetic means is adjustable so that the second magnetic field is adjustable in characteristics. The adjustable magnetic means, therefore, may be set so as to control the level at which the current through the current-carrying coil trips the magnetic switch. The magnetic means for producing the second magnetic field may either be a permanent magnet, an electromagnet or an electromagnetic coil.

PATENTED JAN 11 1972
3,634,794
SHEET 1 OF 3
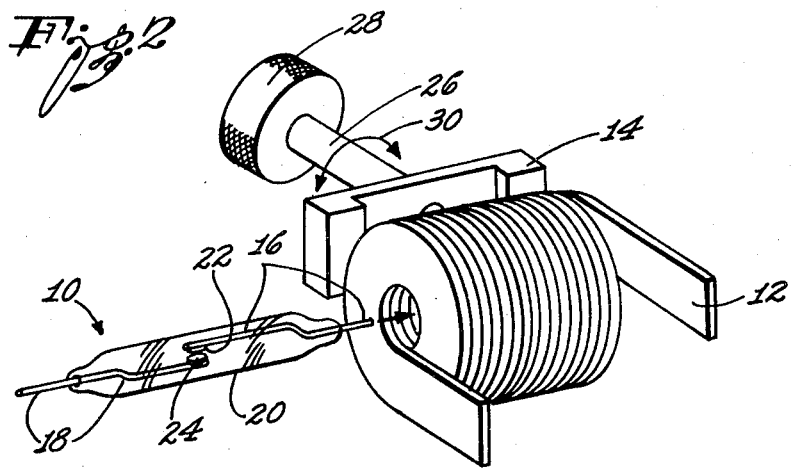
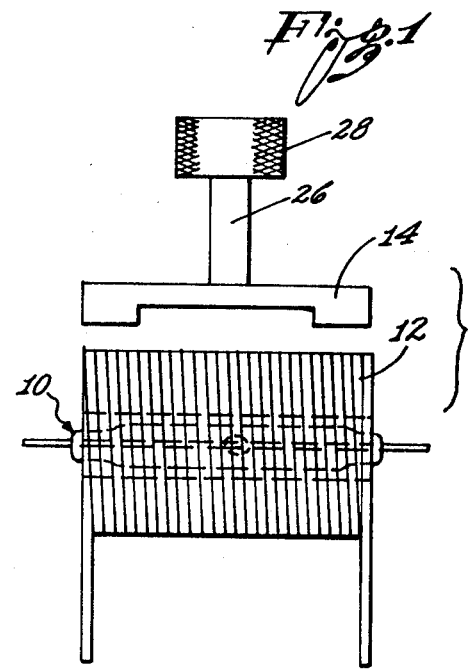
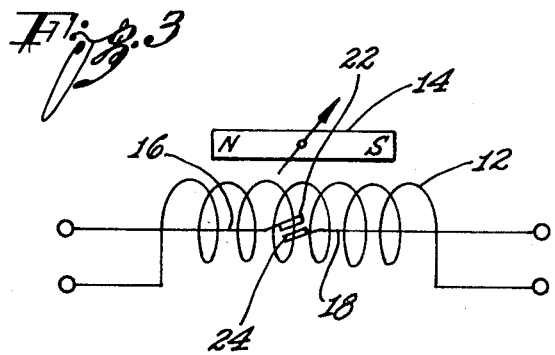
INVENTOR:
Pol R. Verbeke
ATTORNEYS

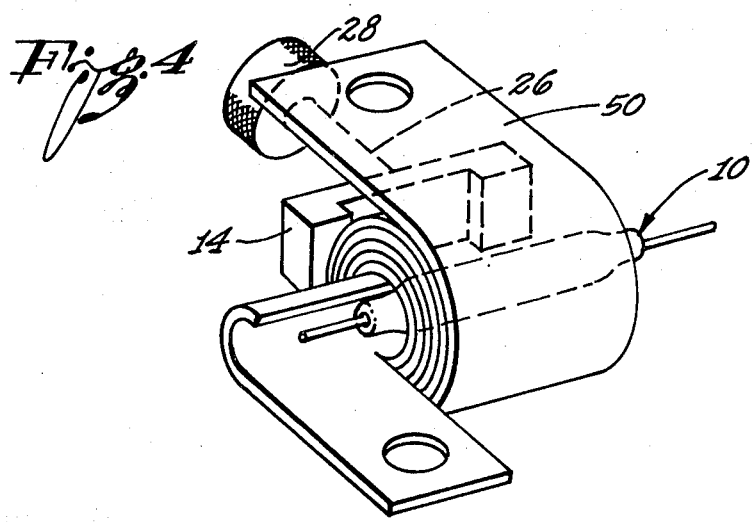
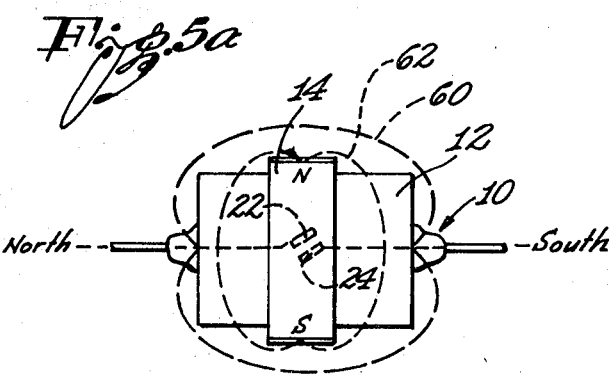
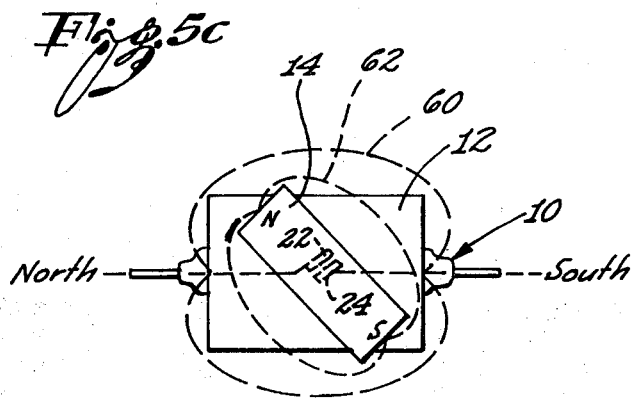

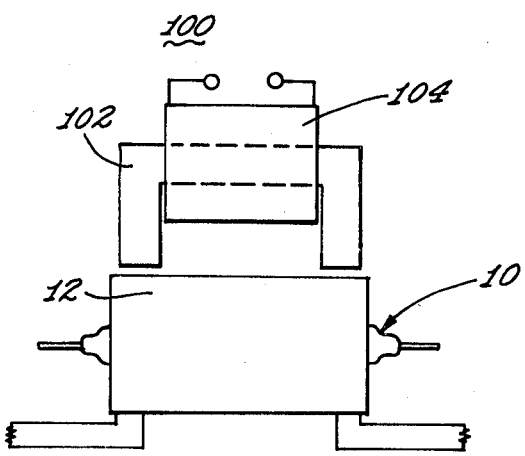
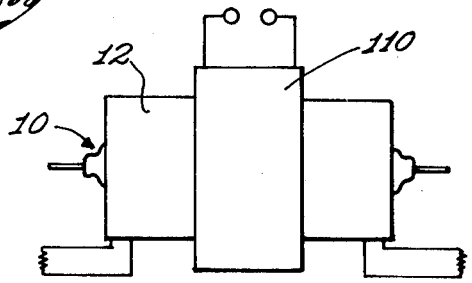
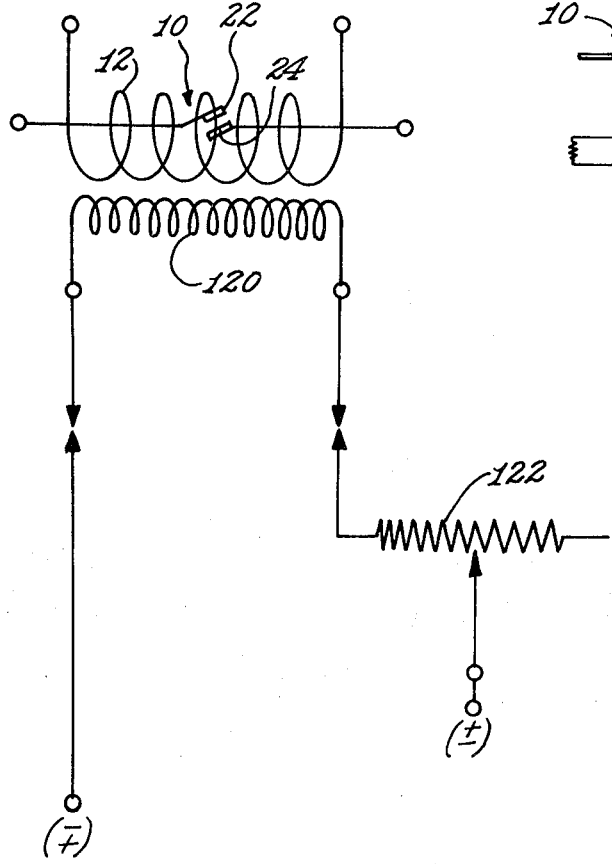

CURRENT LEVEL SENSOR

The present invention is directed to a current level sensor system which has an adjustable control point so that the system may be adjusted to sense a particular level of current and wherein a switch is either activated or deactivated in accordance with the sensing of this particular level of current. The level of current necessary to control the switch is controlled in accordance with an adjustable magnetic means so that the system has an adjustable control point.

The current level sensor system of the present invention has an adjustable control point which is repeatable and which has a very high accuracy over an exceptionally wide adjustment range. For example, the control point may be repeatable with an accuracy of one percent (1 percent) over an adjustment of 60 to 1. In addition, the system may be designed to operate using either fairly small currents, such as a few milliamperes, to relatively high currents, such as thousands of amperes. Particular embodiments of the invention are shown which have applicability to these wide operating currents.

The current level sensor system of the present invention has many possible applications. Generally, whenever a wide range of current sensing without a large voltage drop is needed, the system of the present invention may be used. A large current surge will not damage or change the control point setting of the system of the present invention. Also, the system is basically inexpensive and has relatively wide tolerances in manufacture but is rugged and reliable and is extremely accurate in its control point setting and repeatability.

As a general indication of the possible uses of the sensing system of the present invention, the following are illustrative of some particular uses to which the system may be put. (A) As an overload warning or automatic shutoff; (B) as an underload warning or automatic shutoff; (C) in a battery charger to control the shutoff point when the battery is fully charged; (D) to set a series of events during a falling current cycle; (E) to set a series of events during a current buildup cycle; (F) to control the current in starting large electric motors; and (G) in any circuit requiring current sensing that is independent of the voltage in the circuit.

It can be seen from the above that many applications of the system of the present invention are possible and the specific uses are only to be limited by the circuit designer's imagination.

The current level sensor system of the present invention may be constructed from a plurality of basic elements which include the following. First, a magnetic switch means such as a reed switch is a basic part of the system and the switch is activated in accordance with a total magnetic field. A second part of the system of the present invention is a current-carrying coil which carries the current which is to be monitored. The current-carrying coil produces a first magnetic field in accordance with the level of the current through the coil and this first magnetic field interacts with the magnetic switch.

A third part of the system is a magnetic means which produces a second magnetic field which also interacts with the magnetic switch. The magnetic means is adjustable so that the second magnetic field is also adjustable in its characteristics. The magnetic means may be adjusted to control the characteristics of the second magnetic field and this adjustment of the second magnetic field provides a control of the control point of the system in the following manner.

The current through the current-carrying coil produces a first magnetic field and the magnetic means produces a second magnetic field. The combination of the first and second magnetic fields controls the magnetic switch. If the second magnetic field is adjusted so that it aids the first magnetic field from the current-carrying coil, then the level of the current through the coil may be lower and still provide for a control of the switch. If, on the other hand, the second magnetic field is adjusted to buck the first magnetic field produced by the current through the current-carrying coil, then the level of the current through the coil must be raised to provide for a control of the switch. It can be seen, therefore, that the adjustment of the second magnetic field from the magnetic means may be used to control the point at which the system is activated, and more specifically to control the level of the current through the current-carrying coil which is necessary to produce an operation of the magnetic switch.

The magnetic means which produces the second magnetic field may take different forms of construction. For example, the magnetic means may be a permanent magnet which is adjustable in position so as to set the control point of the system. The magnetic means may also be an electromagnet which is adjustable in current level and/or in position and which again provides for an adjustment in the control point of the system. Finally, the magnetic means may be an electromagnetic coil which would produce a magnetic field in accordance with the current through the coil and would provide an adjustment of the control point of the system in accordance with the level of the current through the coil.

A clearer understanding of the invention will be had with reference to the following description and drawing, wherein:

FIG. 1 illustrates a first embodiment of the invention using a permanent magnet;

FIG. 2 shows in perspective view the first embodiment of the invention;

FIG. 3 illustrates in schematic form the electrical circuit equivalent of the first embodiment of the invention;

FIG. 4 illustrates a second embodiment of the invention which is a modification of the first embodiment of the invention;

FIGS. 5a through 5c illustrate the operation of the first and second embodiments of the invention and specifically illustrate the interaction of the magnetic fields;

FIG. 6 illustrates a third embodiment of the invention using an electromagnet;

FIG. 7 illustrates a fourth embodiment of the invention using an electromagnetic bias coil; and FIG. 8 illustrates in schematic form the electrical equivalent of the third and fourth embodiments of the invention and, in addition, includes means for providing a remote control of the control point.

In FIG. 1, a first embodiment of the current level sensor of the present invention is shown. The current level sensor of FIG. 1 includes a magnetic switch 10 which may be of the reed type. Surrounding the magnetic switch 10 is a current-carrying coil 12. A permanent magnet 14 is used as an adjustable magnetic means to vary the control point of the current level sensor of FIG. 1.

FIG. 2 illustrates in more detail the current level sensor of FIG. 1 and specifically shows the current level sensor in a perspective exploded view. In FIG. 2, the magnetic means 10 is shown to be a reed switch including a pair of nonpolarized conducting leaves 16 and 18 which are sealed through opposite ends of a glass tube 20. The conducting leaves 16 and 18 extend through the ends of the tube 20 and may be connected to an outside circuit. A pair of contact members 22 and 24 are mounted on the inner end portions of the conducting leaves 16 and 18.

In the operation of the reed switch 10, the contact members 22 and 24 are brought together to make an electrical contact. The conducting leaves 16 and 18 have a spring constant which is normally biased to maintain the contacts 22 and 24 separated. It is to be appreciated that the reed switch 10 shown in FIG. 2 is of the normally open type and the switch 10 would be closed in accordance with the imposition of a magnetic field on the reed switch. However, the reed switch could also be designed to be of a normally closed type and would be opened in accordance with the imposition of a magnetic field.

The operation of the reed switch is controlled in accordance with the total magnetic field imposed on the switch. For example, when a magnetic field of a first polarity is induced in one of the conducting leaves, such as conducting leaf 16, and a magnetic field of opposite polarity is induced in the other of the conducting leaves, such as conducting leaf 18, the conducting leaves 16 and 18, having opposite magnetic polarity, will be drawn together by magnetic attraction. Specifically, a contact will be made between the contacts 22 and 24 if the total magnetic field strength is greater than the mechanical spring force holding the leaves apart.

As long as the magnetic field is sustained, the contacts 22 and 24 will be maintained together to complete the circuit between the conducting leaves 16 and 18. When the external magnetic field decays, the spring contact of the leaves 16 and 18 will open the contacts 22 and 24 when the spring constant is greater than the external magnetic field. The crossover point at which the contacts 22 and 24 are either open or closed is generally called the control point.

The magnetic switch 10 is a mechanical device which has fixed dimensions and a specific spring constant and therefore requires a particular magnitude for the external magnetic field to actuate the closure of the contacts. Therefore, there is a predictable magnetic field which is necessary to close the contacts 22 and 24 and, because there is a small fixed hysteresis in the switch, there is a slightly different magnetic field required to open the switch 10.

The hysteresis in the reed switch is due to the spring constant of the conducting leaves 16 and 18 plus the inverse square law of magnetic closure. Basically, the hysteresis means that the magnetic switch 10 must be subjected to a slightly higher magnetic field to close the switch than is necessary to open the switch. Since this hysteresis is relatively small, it is not significant in most operations of the current level sensor of the present invention.

In the embodiment of FIGS. 1 and 2, the current-carrying coil 12 is shown to be a coil which is edge-wound of rectangular insulated wire. The use of this particular structure for the coil 12 allows for a short compact coil having a large conductive cross section for heavy current but still allowing many turns for the current-carrying coil 12. This type of coil, therefore, has a compact efficient magnetic field and a low resistance. The low resistance has the advantage of low insertion loss in the current-carrying circuit being monitored. Specifically, the coil 12 carries the current which is being monitored and the magnetic field generated by the current through the coil is part of the magnetic field used to actuate the magnetic switch 10.

A second embodiment of the invention is shown in FIG. 4 and is similar to the embodiment of the invention shown in FIGS. 1 and 2 but includes a different form for the current-carrying coil. In FIG. 4, similar elements are given similar reference characters.

The embodiment of FIG. 4 includes a magnetic switch such as the reed switch 10 and an adjustable magnetic means such as the permanent magnet 14. However, the embodiment of FIG. 4 includes an insulated heavy strap conductor 50 which serves as the current-carrying coil. As can be seen in FIG. 4, the strap conductor 50 is single-layer wound. The entire coil 50 is wound from one piece and, as can be seen, the inner end is formed with an extension so as to provide for an attachment within a circuit which is to be monitored.

The embodiment of FIG. 4 is designed to be used for heavy current sensing. As an example, the embodiment of FIGS. 1 and 2 may be used for a medium current application of from 1 to 50 amps. The embodiment of FIG. 4, on the other hand, may be used for a heavy current application of from 10 to 1,000 amps. It is, of course, possible to use finer wire than that shown in the embodiment of FIGS. 1 and 2 for the monitoring of currents below the levels indicated above, and the invention is not to be limited to the specific current-carrying coil structures shown in FIGS. 2 and 4.

Returning to the embodiment of the invention shown in FIGS. 1 and 2, the magnetic means 14, such as the permanent magnet, is adjustable in position by a shaft member 26 which shaft member is controlled by a knob 28. As can be seen in FIG. 2, the permanent magnet 14 may be rotated by the knob 28 in either direction as shown by the arrow 30. The second embodiment of the invention shown in FIG. 4 includes a similar permanent magnet 14 and adjustable shaft member 26 controlled by a knob 28.

FIG. 3 illustrates in schematic form the invention as shown by the embodiments illustrated in FIGS. 2 and 4. In FIG. 3, the magnetic switch includes the leaf members 16 and 18 which serve as leads and the contact members 22 and 24. The current-carrying coil 12 is shown to enclose the switch means and it is to be appreciated that the coil 50, as shown in FIG. 4, may be used in place of the coil 12. Finally, the adjustable permanent magnet 14 is shown to be adjacent to the coil 12.

A clearer understanding of the invention may be had with reference to FIGS. 5a through 5c which illustrate the operation of the first and second embodiments of the invention and specifically the interaction of the magnetic fields produced by the current-carrying coil and the permanent magnet means. In FIGS. 5a through 5c, the reed switch 10 is shown to extend through the current-carrying coil 12. Again, it is to be appreciated that the current-carrying coil 50 of FIG. 4 may be substituted for the current-carrying coil 12 as shown in FIG. 2. Finally, the permanent magnet 14 is illustrated to be in a different position for varying the control point of the system.

In FIGS. 5a, 5b and 5c, the current-carrying coil 12 produces a magnetic field as shown by the dotted lines 60. The magnitude of the field is in accordance with the level of the current through the current-carrying coil 12. As is explained, the contact members 22 and 24 of the reed switch 10 will be closed when a particular magnitude of the total magnetic field is reached, which magnitude is sufficient to overcome the spring constant of the reed switch. In FIGS. 5a, 5b and 5c, the magnetic field produced by the permanent magnet 14 is illustrated by the dotted lines 62.

In FIG. 5a, the permanent magnet 14 is positioned so that its magnetic field 62 is at right angles to the field 60 produced by the coil 12. The polarity of the field 60 produced by the coil 12 is illustrated by the designations North and South in FIGS. 5a, 5b and 5c. The polarity of the field 62 produced by the permanent magnet 14 is illustrated by the markings of N and S on the magnet 14.

As shown in FIG. 5a, the magnetic field 62 produced by the permanent magnet 14 has no effect in the system since this field 62 is at right angles to the field 60 and neither aids nor bucks the field 60 so that the reed switch 10 is activated only in accordance with the magnetic field 60 produced by the current through the coil 12. When the current through the coil 12 is of sufficient intensity, the magnetic field 60 overcomes the spring constant of the reed switch and the contact members 22 and 24 are closed.

In FIG. 5b, the permanent magnet 14 has been rotated so that the magnetic field 62 produced by the permanent magnet 14 bucks the magnetic field 60 produced by the current flowing through coil 12. Therefore, it is necessary to use a greater current through the coil 12 to produce a closing of the contact members 22 and 24. It can be seen, therefore, that the position of the magnet 14 may be continuously adjusted so that its magnetic field will buck the magnetic field produced by the coil 12 to different degrees to allow for an adjustment in the level of current required through the coil 12 to produce a closing of the contact member 22 and 24 of the reed switch 10.

FIG. 5c illustrates the positioning of the permanent magnet 14 so that the magnetic field 62 produced by the permanent magnet 14 aids the magnetic field 60 produced by the coil 12. Since the magnetic fields are aiding, this allows the contact members 22 and 24 to be closed at a lower current level than would be necessary if the permanent magnet were not included in the system. It is, therefore, seen that the adjustment of the permanent magnet since it has the property of either adding to or subtracting from the magnetic field produced by the flow of current through the coil 12, provides for a variation in the control point of the system and that a wide range of control points may be set merely by adjusting the position of the permanent magnet 14.

FIG. 6 illustrates a third embodiment of the invention which also includes a magnetic means 10, which may be a reed switch, and a current-carrying coil 12, which may be the coil 12 shown in FIGS. 1 and 2,7 or may be a coil similar to the coil 50 shown in FIG. 4. The embodiment of FIG. 6, however, includes a different structure for the magnetic means. Specifically, the embodiment of FIG. 6 includes electromagnet 100 which may be constructed of an iron core 102 and a bias coil 104.

Current is applied to the bias coil 104 so as to produce a magnetic field from the ends of the iron core 102. It is to be appreciated that the level of current through the bias coil 104 will vary the magnitude of the magnetic field produced from the electromagnet 100 and, in addition, the direction of current through the bias coil 104 will control whether the magnetic field aids or bucks the magnetic field produced by the coil 12. Therefore, the use of the electromagnet may provide for a remote control of the control point setting of the current level sensor of the present invention.

In addition, automatic control may be provided so that the setting for the control point may be adjusted automatically at a remote position. In addition to the above-mentioned type of remote control, it is to be appreciated that the entire electromagnet shown in FIG. 6 may be rotated so as to vary the magnetic field. In this way, a constant current may be connected to the bias coil 104, but the control point may still be set by rotating the electromagnet 100.

FIG. 7 illustrates a fourth embodiment of the invention and specifically includes the magnetic switch 10, such as a reed switch, and a current-carrying coil 12. The magnetic means of FIG. 7 is provided by a bias coil 110 which is wound on the same axis as the current-carrying coil 12. In the embodiment of the invention shown in FIG. 7, the control point is set by the level of the current through the bias coil 110 and, in addition, in accordance with the polarity of the current flowing in the bias coil 110.

FIG. 8 illustrates a schematic of a control circuit which may be used with the embodiments of the invention shown in FIGS. 6 and 7. Specifically, FIG. 8 illustrates the magnetic switch means 10 which includes contact members 22 and 24. A current-carrying coil 12 is positioned to surround the magnetic switch means 10 and produce a magnetic field which may be used to control the closing of the contact members 22 and 24 in accordance with a particular level of current through the coil 12. A bias coil 120 is shown adjacent to the current-carrying coil 12. The bias coil 120 may be the bias coil 104 shown in FIG. 6 or the bias coil 110 shown in FIG. 7. If the bias coil 120 is to be of the type shown by the bias coil 110 illustrated in FIG. 7, then the bias coil would actually be wound on the same axis as the current-carrying coil 12.

The output lead members from the bias coil 120 are connected to a source of input voltage and the polarity of the input voltage may be reversed so as to control the polarity of the current through the bias coil 120. The magnitude of the current through the bias coil 120 may be controlled by a rheostat 122. It is to be appreciated that the rheostat 122 provides for a continuous control of the current through the bias coil 120 but that a plurality of multiple fixed points may also be provided using a switch member.

The present invention is, therefore, directed to a current level sensing system which is inexpensive, has wide tolerances in its manufacture, is rugged, reliable and very accurate in its control point setting and in the repeatability of this control point setting. It is to be appreciated that, although the embodiments of the invention have been shown with reference to the closing of a magnetic switch, the same or similar type of structure may be used with a switch which is normally closed as opposed to normally open. Also, it is to be appreciated that large variations in the actual current to be monitored may be effected in accordance with the design of the current-carrying coil.

I claim:

1. A current level sensor, including magnetic switch means having an open state and a closed state and with the open and closed states controlled in accordance with a particular magnitude of a total magnetic field, current-carrying means disposed in proximity to the magnetic switch means and with the current-carrying means producing a first magnetic field in response to current flowing through the current-carrying means, and permanent magnet means disposed in proximity to the current-carrying means for producing a second magnetic field interacting with the first magnetic field to produce a total magnetic field to control the magnetic switch means and means adjustably mounting the permanent magnet to adjust the position of the permanent magnet means to control the magnitude and direction of the second magnetic field to control the current level through the current-carrying means which is necessary to produce the particular magnitude of the total magnetic field.

2. The current level sensor of claim 1 wherein the current-carrying means is a coil which surrounds the magnetic switch means.

3. The current level sensor of claim 1 wherein the current-carrying means is a helical coil formed from flat wire which surrounds the magnetic switch means.

4. The current level sensor of claim 1 wherein the current-carrying means is a spiral coil formed from flat wire which surrounds the magnetic switch means.

5. A current level sensor, including magnetic switch means controlled to a closed state by a total magnetic field over a particular magnitude, coil means responsive to a current for producing a first magnetic field, permanent magnetic means for producing a second magnetic field to interact with the first magnetic field and with the combination of the first and second magnetic fields providing the total magnetic field to control the magnetic switch means, and adjustable means connected to the permanent magnetic means for adjusting the position of the permanent magnetic means to control the magnitude and direction of said magnetic field.

6. The current level sensor of claim 5 wherein the coil means surrounds the magnetic switch means.

7. The current level sensor of claim 5 wherein the coil means surrounds the magnetic switch means and is a helical coil formed from flat wire.

8. The current level sensor of claim 5 wherein the coil means surrounds the magnetic switch means and is a spiral coil formed from flat wire.

9. A current level sensor having an adjustable control point in accordance with a total magnetic field, including current-carrying means responsive to a current for producing a first magnetic field in accordance with the level of the current, permanent magnetic means adjustable in position for producing a second magnetic field having adjustable characteristics, means adjustably mounting the permanent magnet to adjust the magnitude and direction of said second magnetic field, and magnetic switch means responsive to the total of both the first and second magnetic fields for controlling the operation of the magnetic switch means and with the adjustment of the control point in accordance with the position of the permanent magnetic means.

10. The current level sensor of claim 9 wherein the current-carrying means is a coil which surrounds the magnetic switch means.

11. The current level sensor of claim 9 wherein the current-carrying means is a helical coil which surrounds the magnetic switch means and is formed from flat wire.

12. The current level sensor of claim 9 wherein the current-carrying means is a spiral coil which surrounds the magnetic switch means and is formed from flat wire.

13. A magnetic reed switch system having an adjustable control point, including a reed switch including magnetic, nonpolarized conducting leaves arranged along a first plane;

a current-carrying coil located adjacent to the reed switch and with the current-carrying coil producing a first magnetic field in accordance with the level of the current through the current-carrying coil, and a U-shaped magnet having pole faces arranged along a second plane parallel to the first plane and additional means adjustably mounting the U-shaped magnet to adjust the poles within the second plane for producing a second adjustable in magnitude and direction magnetic field and with the combination of the first and second magnetic fields controlling the operation of the reed switch and with the position of the pole faces of the magnet controlling the combination of the first and second magnetic fields.

14. The magnetic reed switch system of claim 13 wherein the U-shaped magnet is a permanent magnet.

15. The magnetic reed switch system of claim 13 wherein the U-shaped magnet is an electromagnet.

* * * * *